United States Patent
Wollack et al.

(10) Patent No.: US 12,276,315 B1
(45) Date of Patent: Apr. 15, 2025

(54) CRYOGENIC THERMAL ISOLATION STAGE WITH INTEGRAL PASSIVE VIBRATION DAMPERS

(71) Applicant: United States of America as represented by the Administrator of NASA, Washington, DC (US)

(72) Inventors: Edward J. Wollack, Clarksville, MD (US); Elmer H. Sharp, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 1050 days.

(21) Appl. No.: 17/220,565

(22) Filed: Apr. 1, 2021

Related U.S. Application Data

(60) Provisional application No. 63/058,575, filed on Jul. 30, 2020.

(51) Int. Cl.
*F16F 15/03* (2006.01)
*F16F 7/10* (2006.01)
*F25B 9/14* (2006.01)

(52) U.S. Cl.
CPC .......... *F16F 15/035* (2013.01); *F16F 7/1011* (2013.01); *F25B 9/14* (2013.01); *F16F 2222/06* (2013.01); *F25B 2500/13* (2013.01)

(58) Field of Classification Search
CPC ........ F16F 15/03; F16F 15/035; F16F 7/1011; F16F 2222/06; F25B 9/14; F25B 2500/13
See application file for complete search history.

(56) References Cited

U.S. PATENT DOCUMENTS

| | | | | |
|---|---|---|---|---|
| 6,252,234 B1 * | 6/2001 | Hazelton | ................ | G03F 7/709 250/442.11 |
| 7,265,470 B1 * | 9/2007 | Paden | .................. | H02K 49/106 310/156.43 |
| 7,830,046 B2 * | 11/2010 | Binnard | .................. | H02K 49/04 355/53 |
| 8,602,648 B1 * | 12/2013 | Jacobsen | ................. | G21K 7/00 378/208 |
| 9,016,943 B2 * | 4/2015 | Jacobsen | ................. | G21K 7/00 378/208 |
| 10,406,559 B2 * | 9/2019 | Okayasu | ................ | H04R 9/066 |
| 10,541,586 B2 * | 1/2020 | Post | ........................ | H02N 1/08 |
| 10,644,579 B2 * | 5/2020 | Nerubenko | .............. | H02K 5/24 |
| 10,880,653 B2 * | 12/2020 | Ilkorur | .................... | H04R 9/043 |
| 11,121,604 B2 * | 9/2021 | Post | ..................... | F16F 15/315 |
| 11,255,406 B2 * | 2/2022 | Jiang | ........................ | F16F 13/04 |
| 11,438,701 B2 * | 9/2022 | Ilkorur | .................... | H04R 9/066 |
| 11,801,756 B2 * | 10/2023 | Deng | ....................... | B60L 13/06 |

(Continued)

*Primary Examiner* — Thomas W Irvin
(74) *Attorney, Agent, or Firm* — Heather Goo; Matthew F. Johnston; Trenton J. Roche (57) ABSTRACT

Systems, methods, and devices of the various embodiments may provide a high-thermal-stability cryogenic-kinematic-mount with passive magnetic vibration damping. In various embodiments, the cryogenic-kinematic-mount may be configured for use in sub-Kelvin environments. Various embodiment cryogenic-kinematic-mounts may provide dampening and thermal isolation without a need for electronics or software feedback-based controls for the mounts. Various embodiments cryogenic-kinematic-mounts may be passive mounts configured to not require dampening controls.

19 Claims, 7 Drawing Sheets

(56) References Cited

U.S. PATENT DOCUMENTS

| | | | | |
|---|---|---|---|---|
| 2003/0005851 | A1* | 1/2003 | Post | F16C 39/063 |
| | | | | 104/281 |
| 2007/0273074 | A1* | 11/2007 | Mizuno | F16F 15/03 |
| | | | | 267/136 |
| 2008/0225253 | A1* | 9/2008 | Binnard | H02K 49/04 |
| | | | | 355/72 |
| 2018/0013331 | A1* | 1/2018 | Post | H02K 7/025 |
| 2019/0091725 | A1* | 3/2019 | Okayasu | H04R 9/066 |
| 2020/0136464 | A1* | 4/2020 | Post | H02N 1/002 |
| 2021/0293301 | A1* | 9/2021 | Jiang | F16F 6/005 |
| 2023/0241980 | A1* | 8/2023 | Deng | B60L 13/04 |

* cited by examiner

CRYOGENIC THERMAL ISOLATION STAGE WITH INTEGRAL PASSIVE VIBRATION DAMPERS

RELATED APPLICATIONS

This application claims priority to U.S. Provisional Patent Application No. 63/058,575, filed on Jul. 30, 2020, the entire contents of which are hereby incorporated by reference in their entirety for all purposes.

ORIGIN OF INVENTION

The invention described herein was made in the performance of work under a NASA contract and by an employee of the United States Government and is subject to Public Law 96-517 (35 U.S.C. 5200 et seq.).

BACKGROUND OF THE INVENTION

Presently envisioned ground-based, sub-orbital, and space-borne missions employ a variety of cryogenic-cooling techniques to achieve thermal environments required for background-limited astrophysical far-to-mid-infrared (approximately 1-to-3000 $cm^{-1}$ or, said another way, approximately 0.030-to-100 THz) imaging, spectroscopy, and polarimetry As the operating temperature of focal planes is reduced the overall instrument sensitivity is improved; however, thermal stability has a correspondingly higher impact on bolometric imaging performance. Mechanical, thermal, electrical, and optical energy sources which are unintentionally coupled to the detector cold stage ultimately increase the noise of bolometric sensors, reduce calibration fidelity, and lead to systematic image artifacts. Sources of ionizing radiation (e.g., cosmic rays) have a similar negative impact on system performance and lead to losses in observing efficiency. For these reasons, mitigating the influence of external excitations in the sensor environment will play a critical role in realizing the next generation of precision astrophysical designs with sensitivities less than $1 \times 10^{-19}$ $W/Hz^{1/2}$.

Similar technological considerations drive the need for improved thermal performance in sub-Kelvin experimental platforms employed in quantum applications, including computing, cryptology, communications, and sensors. Vibrational or microphonic energy dissipated on the cold stage (e.g., from cryocoolers coolers, compressors, external sources, etc.) not only leads to detector heating but also reduces the cryogen hold time in instrument systems. The latter effect reduces the observing efficiency (or availability) of the system for measurements of astronomical targets of interest. Photon counting detectors (e.g., in the optical and x-ray wavelengths) based on micro-calorimetric sensors performed at sub-Kelvin temperatures share similar cooling and observational efficiency considerations.

BRIEF SUMMARY OF THE INVENTION

Systems, methods, and devices of the various embodiments may provide a high-thermal-stability cryogenic-kinematic-mount with passive magnetic vibration damping. In various embodiments, the cryogenic-kinematic-mount may be configured for use in sub-Kelvin environments. In various embodiments, kinematic mounting techniques may be used to achieve high thermal isolation and a stage resonant frequency of the cryogenic-kinematic-mount approaching approximately 500 Hz. In various embodiments, integrated passive magnetic dampers and shielding may be used to limit electromagnetic coupling to a platform volume connected to the cryogenic-kinematic-mount. Various embodiment cryogenic-kinematic-mounts may be configured for use with superconducting far-to-mid-infrared astrophysical sensors, for use with quantum computing systems, and/or for use with other type systems. Various embodiment cryogenic-kinematic-mounts may provide dampening and thermal isolation without a need for electronics or software feedback-based controls for the mounts. Various embodiments cryogenic-kinematic-mounts may be passive mounts configured to not require active dampening control systems. Various embodiment cryogenic-kinematic-mounts may be configured to define and maintain alignment of system elements. In various embodiments, a damping system of a cryogenic-kinematic-mount may intentionally convert vibrational energy into joule heating, which may be deposited on a warmer side of the cryogenic-kinematic-mount that may be associated with a cooling system with greater cooling capacity.

Various embodiments may include a cryogenic kinematic-mount, comprising: a cold side stage; a warmer side stage opposite the cold side stage; and a dampening and tensioning system between the cold side stage and warmer side stage, wherein the dampening and tensioning system includes at least one magnetic array and wherein the dampening and tensioning system provides dampening and thermal isolation between the cold stage and the warmer side stage.

Various embodiments may include a cryogenic-kinematic-mount, comprising: a cold side stage; a warmer side stage opposite the cold side stage; and a dampening and tensioning system between the cold side stage and warmer side stage, wherein the dampening and tensioning system includes two magnetic arrays opposite two metal plates and wherein the dampening and tensioning system provides dampening and thermal isolation between the cold stage and the warmer side stage.

These and other features, advantages, and objects of the present invention will be further understood and appreciated by those skilled in the art by reference to the following specification, claims, and appended drawings.

DETAILED DESCRIPTION OF THE INVENTION

Figure 2A:
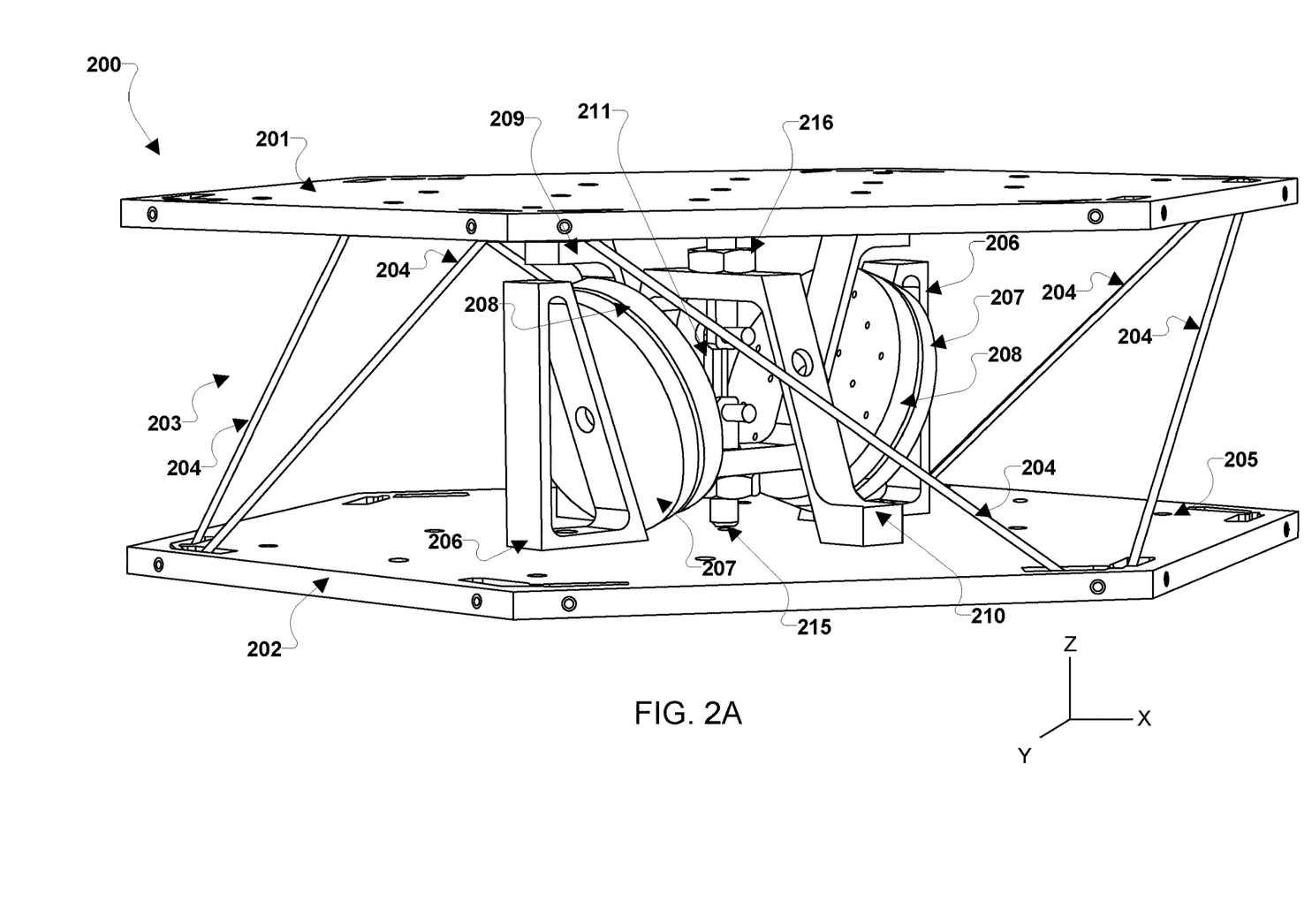
FIGS. 2A-2D illustrate aspects of an example cryogenic-kinematic-mount interface to the instrumentation package according to various embodiments.
Figure 2B:
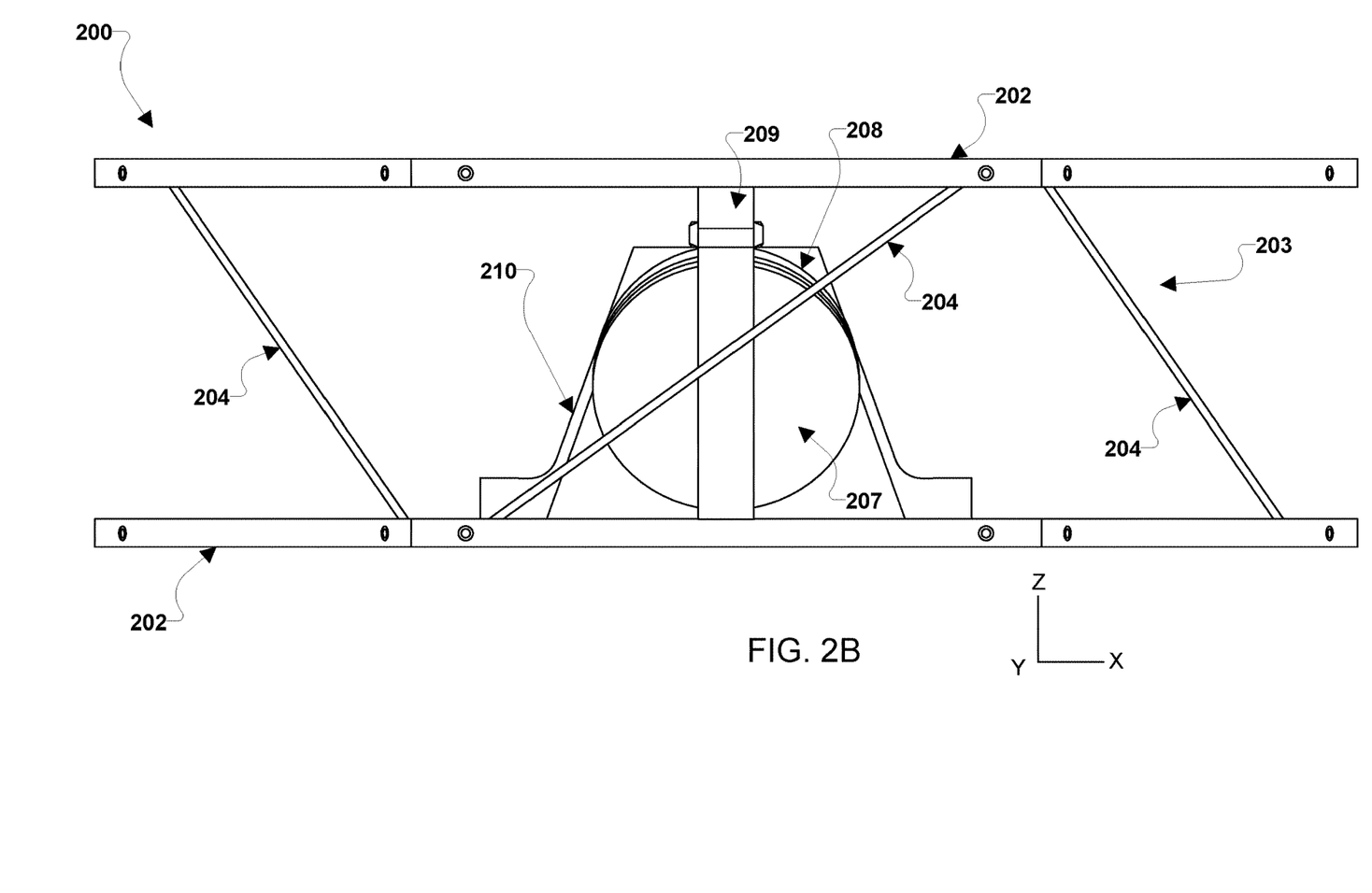
Figure 2C:
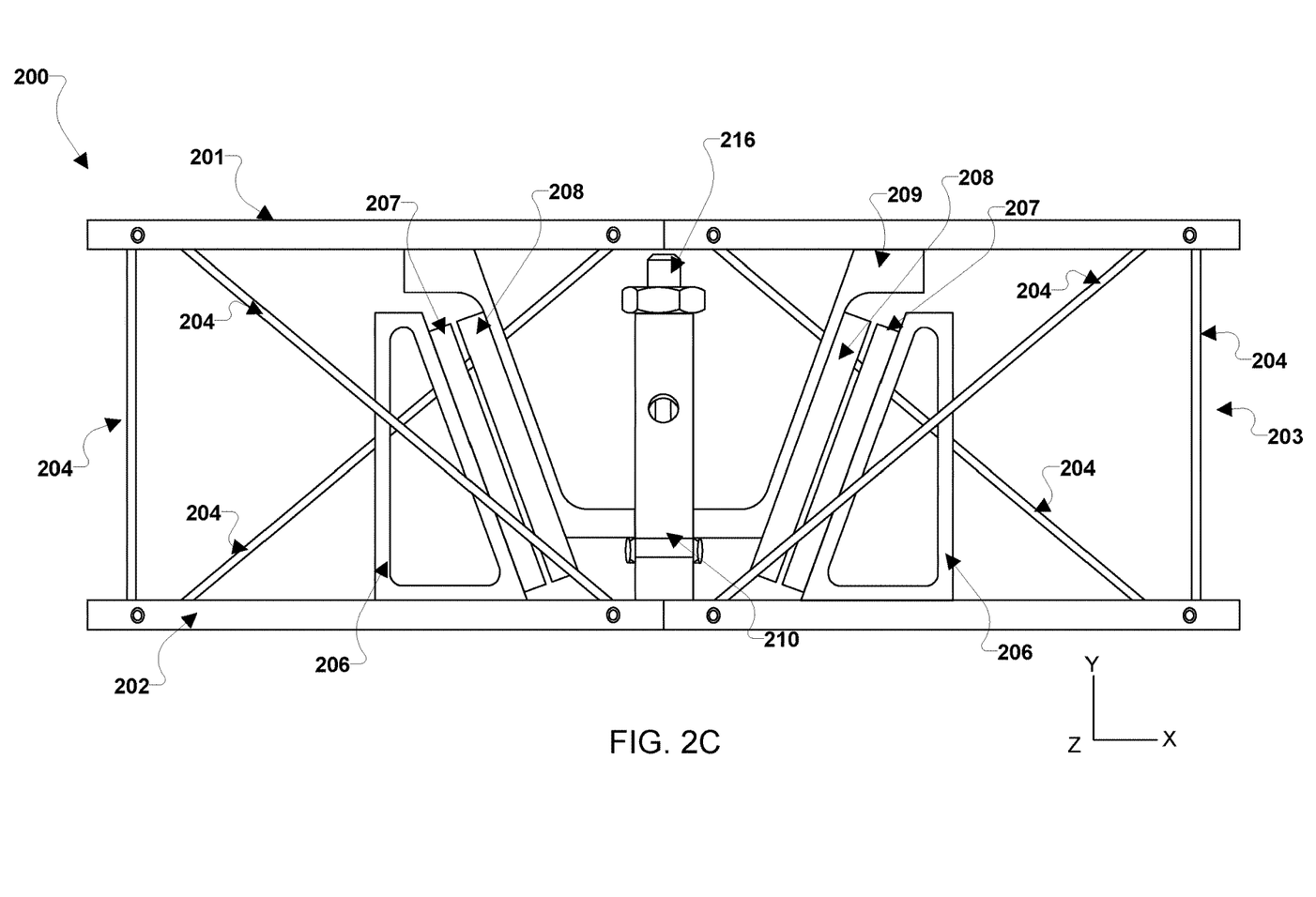

For purposes of description herein, the terms "upper," "lower," "right," "left," "rear," "front," "vertical," "horizontal," and derivatives thereof shall relate to the invention as oriented in FIG. 2B. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Sensors in cryogenically cooled systems may be sensitive to mechanical, thermal, electrical, and/or optical energy sources. For example, bolometric sensor-based systems may suffer image degradation (e.g., increased detector noise, image artifacts, etc.) when experiencing unintended mechanical, thermal, electrical, and/or optical energy. As another example, quantum computing systems may experience reductions in coherence time (i.e., time to carry out computational operations) or incorrectly detect a quantum state of a quantum sensor when experiencing unintended mechanical, thermal, electrical, and/or optical energy.

In some systems these effects may be mitigated by reducing the coupling of external vibrations to cooling and detector systems by increasing the frequency separation between their vibrational modes, and when applicable, through the use of more sophisticated active damping systems. However, such active damping systems may not be suitable for future detector systems, such as astrophysical designs with sensitivities less than $1\times10^{-19}$ W/Hz$^{1/2}$, quantum computing systems, etc. Vibration isolation, stiffness-controlled suspensions, and eddy-current dampers may be required to mitigate excitation to the required levels. Simply put, sub-Kelvin instrumentation benefits from a low vibrational environment. As low vibrational environments are not always feasible, cryogenic-kinematic-mounts that damp vibrational energy in a controlled manner with minimal complexity would be beneficial.

Systems, methods, and devices of the various embodiments may provide a high-thermal-stability cryogenic-kinematic-mount with passive magnetic vibration damping. In various embodiments, the cryogenic-kinematic-mount may be configured for use in sub-Kelvin environments. In various embodiments, kinematic mounting techniques may be used to achieve high thermal isolation, mechanical stiffness/alignment, and a stage resonant frequency of the cryogenic-kinematic-mount approaching approximately 500 Hz. In various embodiments, a cryogenic-kinematic-mount may be configured to provide structural support and precision alignment for an instrument package (e.g., a sensor package or other type package) supported by the cryogenic-kinematic-mount. In various embodiments, integrated passive magnetic dampers and shielding may be used to limit electromagnetic coupling to a platform volume connected to the cryogenic-kinematic-mount. Various embodiment cryogenic-kinematic-mounts may be configured for use with superconducting far-to-mid-infrared (approximately 1-to-3000 cm$^{-1}$ or, said another way, approximately 0.030-to-100 THz) astrophysical sensors, for use with quantum computing systems, and/or for use with other type systems. Various embodiment cryogenic-kinematic-mounts may provide dampening and thermal isolation without a need for electronics or software feedback-based controls for the mounts. Various embodiments cryogenic-kinematic-mounts may be passive mounts configured to not require dampening controls. Various embodiment, cryogenic-kinematic-mounts may be configured for use with sub-Kelvin temperature range sensor systems detecting in various waveband ranges, such as optical sensors, microwave sensors, infrared sensors, x-ray sensors, etc. In various embodiments, a dampening system of a cryogenic-kinematic-mount may be configured to convert vibrational energy into joule heating, and the joule heating may be deposited on the warmer side of the mount that has a cooling system with greater cooling capacity.

As used herein the term "kinematic" in relation to a mount, such as a cryogenic-kinematic-mount, may refer to a ridged body mount structure with three translation and three rotational degrees of freedom. A kinematic mount locates and orients a rigid body with N constraints leaving the number degrees of freedom (DOE), i.e., DOE=6−N. More than N constraints or contact point results in uncertainty and instability. As a specific illustrative example, a table-like kinematic mount intentionally constrains three degrees of freedom to produce a stable and deterministic reference plane by using three points of contact. The advantage of a kinematic mount is by definition it is not over-constrained and thus has a repeatable response to physical disturbances, which is a desirable attribute for precision instrumentation alignment. In various embodiments, a cryogenic-kinematic-mount may be configured to constrain selected degrees of freedom, such as one, two, three, four, five, or six degrees of freedom, such that a focal plane of an instrument package supported by the cryogenic-kinematic-mount is known upon cooling of the system from room temperature to instrument package operation temperature, such as a sub-Kelvin operation temperature. In various embodiments, a constraint provided by an embodiment cryogenic-kinematic-mount along a degree of freedom may be of varying strength, such as varying from strongest (e.g., completely rigid along that degree of freedom completely counteracting any force along that degree of freedom) to weakest (e.g., a low, but non-zero, force along that degree of freedom only somewhat counter-acting any force along that degree of freedom). In various embodiments, constraint strengths along different degrees of freedom provided by an embodiment cryogenic-kinematic-mount may be different along some or all degrees of freedom. For example, one or more degrees of freedom may have strong constraints and one or more degrees of freedom may have weak constraints. The difference in constraint strength along different degrees of freedom may enable an embodiment a cryogenic-kinematic-mount to survive cooling with repeatable performance and without damage with thermal cycles.

Various embodiments may provide a cryogenic-kinematic-mount configured as a cold-stage with integral eddy current dampers based on rare earth neodymium-iron-boron magnets (or other types of magnets) and a high conductivity normal metal structure, which do not present a thermal path between the cold stage and its mount at a higher temperature. The stage's vibrational energy may be passively dissipated on the approximately 3-4 Kelvin side of the thermal interface in a high purity copper (e.g., greater than 99.99% annealed copper) plate. This avoids heating the sub-Kelvin cryogenic system, which has lower cooling power. In some embodiments, the cryogenic-kinematic-mount may include layered thermal diffuser plates configured to minimize lateral gradients and thermal overall stability across the thermal stage realized with a reduction in structural mass. The reduction of structural mass may be advantageous because the total suspended mass and the mount stiffness set the minimum resonant frequency. Having the minimum resonant frequency as high as possible may in practice be beneficial to limit coupling to various mechanical sources in the system. The various embodiment cold-stage designs may provide a kinematics cold-stage with a significantly higher minimum unloaded resonant frequency, such as approximately 500 Hz, while maintaining high-thermal isolation between the sub-Kelvin and the thermal-guard stages. This higher minimum unloaded resonant frequency achieved by the various embodiments represents approximately an order of magnitude improvement over conventional cryogenic mounts. As a point of reference—the suspended mass of a four kilo-pixel absorber coupled focal plane array is presently approximately equal to 1-to-2 kg—whereas the various embodiments described herein may accommodate the mass of envisioned future far-to-mid infrared focal planes, which have significantly larger array formats.

Various embodiments may be configured to utilize magnetic dampening while confining the magnetic field of the magnetic dampeners so as to not negatively impact the sensor system being supported by an embodiment cryogenic-kinematic-mount. A key consideration for cryogenic applications is maximizing the magnetic field confinement in the electrically conductive damper surface to ensure compatibility with the operation of superconductive sensors and to achieve thermal uniformity and stability. Various embodiments may use a magnetic array to provide magnetic dampening with controlled magnetic flux concentration. In various embodiments, a Halbach magnet array may be used to provide magnetic dampening. In various embodiments, the Halbach magnet array may be configured such that the magnetic flux is concentrated on one face of the array. High multi-pole order in the Halbach magnet array may lead to a rapid fall off in field strength with distance. These attributes of the Halbach magnet array in various embodiments may reduce required shielding for use with superconducting sensors and other electrical devices.

In various embodiments, the cryogenic-kinematic-mount may be configured such that a field from a magnetic array may be directed toward a high purity copper (e.g., greater than 99.99% annealed copper) plate with the geometry of the copper plate tailored to maximize eddy-current breaking. The high purity copper (e.g., greater than 99.99% annealed copper) plate leads to a maximal magnetic damping coefficient and high residual resistance ratio (RRR) increasing the passive eddy-current losses with cooling. In various embodiments, the high purity copper (e.g., greater than 99.99% annealed copper) plate surface being in close proximity to the concentrated field of the magnetic arrays facilitates the conversion of mechanical motion into ohmic eddy current losses.

In various embodiments, a superconducting set-point temperature-standard (or other primary temperature standard) may be used as a method of realizing a regulating source to set and stabilize the stage temperature. In some embodiments, resistive (e.g., ruthenium oxide, germanium diodes, etc.) or other secondary thermometry technologies may be employed to monitor the temperature of the stage's integral diffuser plate and/or employed as a sensor for a redundant active proportional-integral-derivative control loop on the cold-stage. However, such resistive thermometry technologies and control loops are optional and not required in the various embodiments.

Figure 1:
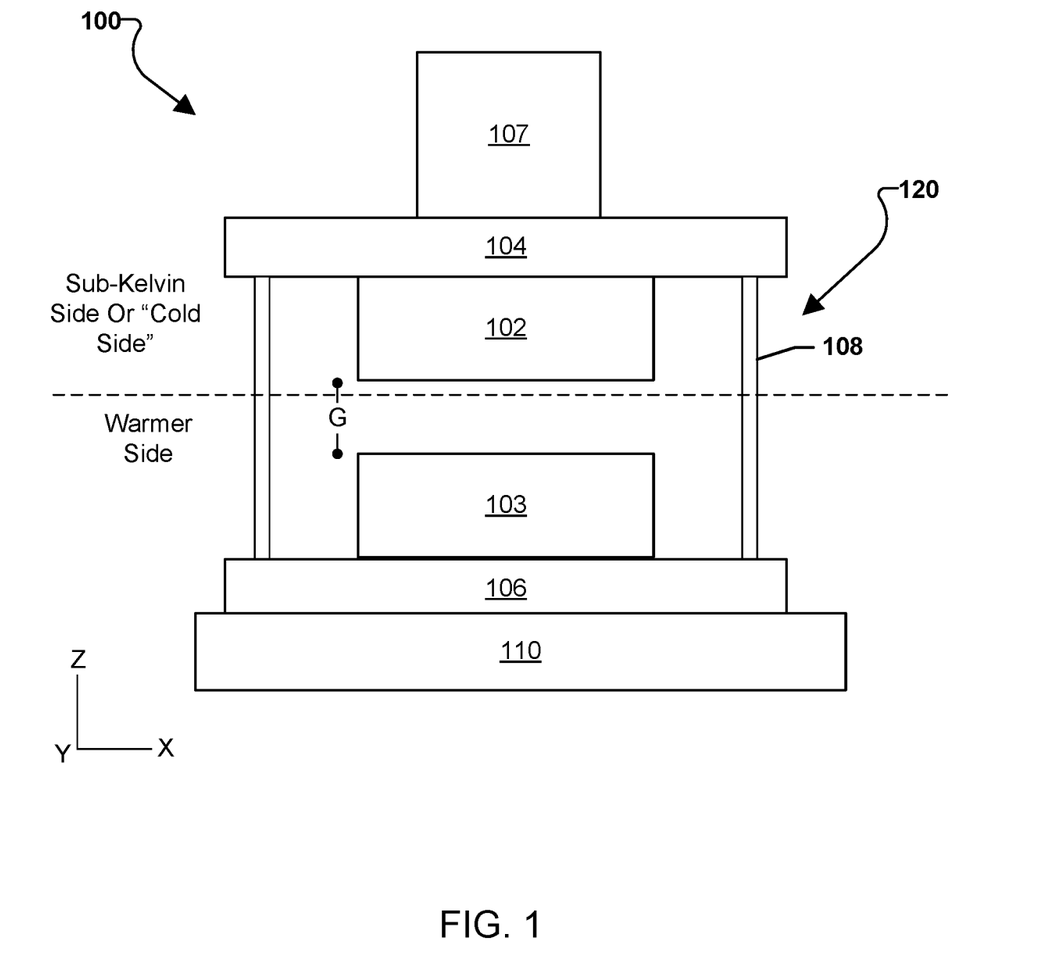
FIG. 1 is a block diagram of components of an example cryogenic-kinematic-mount according to various embodiments.

FIG. 1 is a block diagram of components of an example cryogenic-kinematic-mount 100 according to various embodiments. The cryogenic-kinematic-mount 100 may be configured to thermally isolate a sub-Kelvin (also referred to herein as cold side) from a warmer side of a system. For example, the sub-Kelvin side may be associated with sub-Kelvin operating temperatures, while the warmer side may be associated with temperatures from 3-4 Kelvin.

The cryogenic-kinematic-mount 100 may include a cold side stage 104 (or sub-Kelvin side stage). Opposite the cold side stage 104 may be a warmer side stage 106. The stages 104 and 106 may be formed from a metal, such as copper, magnesium, etc. The cold side stage 104 may be configured such that an instrument package 107, such as an astrophysical sensor system, quantum computing system, etc., may be mounted to one surface of the cold side stage 104 (e.g., an upper side surface opposite the side of the cold side stage 104 facing the warmer side stage 106). The warmer side stage may be configured such that a plant system 110, such as a cryogenic cooling system or other type system, may be mounted to one surface of the warmer side stage 106 (e.g., a lower side surface opposite the side of the warmer side stage 106 facing the cold side stage 104).

The cryogenic-kinematic-mount 100 may include one or more magnetic arrays 102, such as a two-dimensional Halbach array (e.g., as discussed with reference to FIG. 3), a one-dimensional Halbach array (e.g., as discussed with reference to FIG. 4), etc. The magnetic arrays 102 may be coupled to the cold side stage 104 on a side of the cold side stage opposite the side on which the instrument package 107 may be mounted.

The cryogenic-kinematic-mount 100 may include one or more metal plates 103, such as a non-super conducting metal plate, such as a high purity copper (e.g., greater than 99.99% purity annealed copper) plate at the temperature of the warmer side. While discussed herein in reference to a high purity copper plate, the metal plate 103 may be any type high conductivity metal that is not super conducting and need not be high purity copper. The metal plates 103 may be coupled to the warmer side stage 106 on a side of the warmer side stage opposite the side on which the plant system 110 may be mounted. The metal plate 103 may be a high electrical conductivity metal plate.

The one or more magnetic array 102 and one or more metal plates 103 may interact with one another to act as a magnetic dampening system for the cryogenic-kinematic-mount 100. A gap space of size "G" may be maintained between a magnetic array 102 and a metal plate 103 such that there is no mechanical interaction between the magnetic array 102 and metal plate 103. The magnetic field provides the coupling and its motion with respect to the metal plate enables transfer and dissipation of vibrational energy between the warm and cold sides of the stage in a non-contacting manner. The dampening system of the cryogenic-kinematic-mount 100 may be comprised of the one or more magnetic array 102 and one or more metal plates 103, their associated fields, and the high electrical conductivity surface of the metal plate(s) 103 where eddy currents are generated, dissipated, and thermally sunk by the warmer side thermal cooling system (i.e., the "bath" or thermal reservoir). The thermal cooling system may be part of the plant system 110.

The magnetic array 102 may be configured such that magnetic field of the magnetic dampeners does not negatively impact the instrument package 107 being supported by the cold side stage 104. The magnetic array 102 may provide magnetic dampening with controlled magnetic flux concentration. In various embodiments, the dampening system of the cryogenic-kinematic-mount 100, such as one or more magnetic array 102 and one or more metal plates 103 interacting with one another, may be configured to convert vibrational energy into joule heating, and the joule heating may be deposited on the warmer side of the cryogenic-kinematic-mount 100 that may be associated with a cooling system with greater cooling capacity.

The cryogenic-kinematic-mount 100 may also include a tensioning and mechanical support/alinement system 108 (also referred to simply as a tensioning system) to hold the cold side stage 104 in place over the warmer side stage 106. The tensioning system 108 may be a series of two or more synthetic fiber strands, such as Kevlar (i.e., poly-para-phenylene terephthalamide or PPTA) strands, etc., for example two, three, four, five, six, or more fiber strands. The fiber strands may be of varying thickness and/or width. The fiber strands may be coupled to the cold side stage 104 and warmer side stage 106, such as by pins, loops, clamps, etc. Together the tensioning system 108, magnetic arrays 102, and metal plates 103 may form a dampening and tensioning system 120 providing dampening and thermal isolation between the cold side stage 104 and the warmer side stage 106. The dampening and tensioning system 120 may provide dampening and thermal isolation between the cold side stage 104 and the warmer side stage 106 without a need for electronics or software feedback-based controls.

In various embodiments, the cryogenic-kinematic-mount 100 may be configured to constrain selected degrees of freedom, such as one, two, three, four, five, or six degrees of freedom, such that a focal plane of an instrument package 107 supported by the cryogenic-kinematic-mount 100 is known upon cooling of the system including the cryogenic-kinematic-mount 100 from room temperature to instrument package 107 operation temperature, such as a sub-Kelvin operation temperature. In various embodiments, a constraint provided by the embodiment cryogenic-kinematic-mount 100 along a degree of freedom may be of varying strength, such as varying from strongest (e.g., completely rigid along that degree of freedom completely counteracting any force along that degree of freedom) to weakest (e.g., a low, but non-zero, force along that degree of freedom only somewhat counteracting any force along that degree of freedom). In various embodiments, constraint strengths along different degrees of freedom provided by the cryogenic-kinematic-mount 100 may be different along some or all degrees of freedom. For example, one or more degrees of freedom may have strong constraints and one or more degrees of freedom may have weak constraints. The difference in constraint strength along different degrees of freedom may enable an embodiment a cryogenic-kinematic-mount to survive cooling without damage. In various embodiments, the cryogenic-kinematic-mount may be configured to provide structural support and precision alignment for the instrument package 107.

Figure 2D:
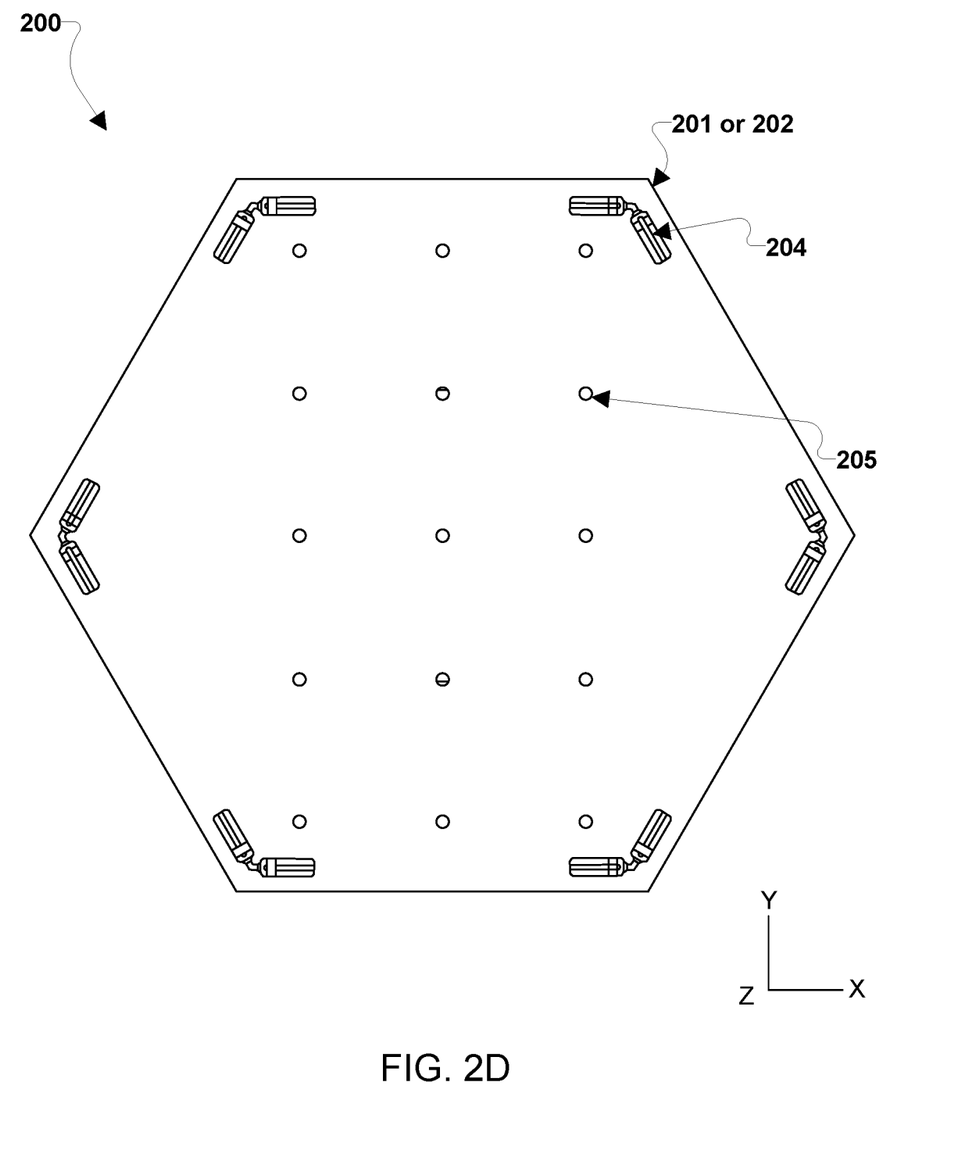

FIGS. 2A-2D illustrate aspects of an example cryogenic-kinematic-mount 200 according to various embodiments. With reference to FIGS. 1-2D, the cryogenic-kinematic-mount 200 may be a specific example of the mount 100 described above. The cryogenic-kinematic-mount 200 is illustrated in a side-perspective view in FIG. 2A, a side-view in FIG. 2B, a side-view rotated 90° around the y-axis from the view in FIG. 2B in FIG. 2C, and in a top or bottom view in FIG. 2D as the top and bottom views may be the same.

Referring to all of FIGS. 2A-2D specifically, the cryogenic-kinematic-mount 200 may include a cold side stage 201 (similar to cold side stage 104) and a warmer side stage 202 (similar to warmer side stage 106). The cold side stage 201 may be opposite the warmer side stage 202. The dampening and tensioning system 203 may be located between the cold side stage 201 and the warmer side stage 202. The cold side stage 201 and the warmer side stage 202 may each have a series of mounting holes 205 therein to which other systems may be mounted to the cold side stage 201 and/or the warmer side stage 202.

The dampening and tensioning system 203 may include a cold side metal bracket 209 coupled to the cold side stage 201. For example, the cold side metal bracket 209 may be a generally "U" shaped bracket formed from a high-strength light-weight metal, such as magnesium, etc. The cold side metal bracket 209 may have two magnetic arrays 208 coupled to opposite sides of the cold side metal bracket 209. The magnetic arrays 208 may be two-dimensional Halbach arrays (e.g., as discussed with reference to FIG. 3), a one-dimensional Halbach arrays (e.g., as discussed with reference to FIG. 4), single magnet arrays, etc.

The dampening and tensioning system 203 may include a warm side metal bracket 210 coupled to the warmer side stage 202. For example, the warm side metal bracket 210 may be a generally "U" shaped bracket formed from a metal, such as magnesium, etc. The warm side metal bracket 210 may be oriented 180 degrees opposite the orientation of the cold side metal bracket 209 and rotated 90 degrees relative to the cold side metal bracket 209. The warm side metal bracket 210 and the cold side metal bracket 209 may overlap one another. Between the warm side metal bracket 210 and the cold side metal bracket 209 may be a tensioned synthetic fabric loop 211, such as a Kevlar loop, etc. held in place by a warm side locking system 216 and a cold side locking system 215. The cold side locking system 215 may not mechanically interact with (e.g., not touch) the warmer side stage 202 and the warm side locking system 216 may not mechanically interact with (e.g., not touch) the cold side stage 201.

The warmer side plate (also referred to as the warmer side stage 202) may include two metal supports 206 having two metal plates 207 coupled thereto. The two metal plates 207 may be non-super conducting metal plates. As a specific example, the two metal plates 207 may be such as a high purity copper (e.g., greater than 99.99% annealed copper) plate. The two metal supports 206 may be formed from a metal, such as magnesium, etc. The two metal supports 206 may be in-line with the orientation of the cold side metal bracket 209 such that a face of the magnetic arrays 208 is oriented toward a face of the metal plates 207. A gap may be maintained between the magnetic arrays 208 and the metal plates 207.

The dampening and tensioning system 203 may include a series of six synthetic fiber strands 204, such as Kevlar strands, etc. The fiber strands 204 may be of varying thickness and/or width. The fiber strands may be coupled to the cold side stage 201 and warmer side stage 202, such as by pins, loops, clamps, etc. The fiber stands 204 and tensioned synthetic fabric loop 211 may operate together to hold the cold side stage 201 and warmer side stage 202 in position relative to one another.

The cryogenic-kinematic-mount 200 may be provide dampening and thermal isolation without a need for electronics or software feedback-based controls. As such, the cryogenic-kinematic-mount 200 may be a passive mount configured to not require dampening controls. Rather the interactions of the fiber strands 204, tensioned synthetic fabric loop 211, magnetic arrays 208, and the metal plates 207 may provide dampening based purely on the configuration in the cryogenic-kinematic-mount 200 without any electronics or software feedback-based controls. Additionally, the lack of a thermal path between the cold side stage 201 and the warmer side stage 202 may provide thermal isolation between the cold side stage 201 and the warmer side stage 202.

While a cryogenic-kinematic-mount 200 is illustrated and discussed with reference to two metal plates 207 and two magnetic arrays 208 in FIGS. 2A-2D, more than two magnetic arrays and metal plates pairings may be used in a cryogenic-kinematic-mount in accordance with the various embodiments and the number of magnetic arrays and metal plates is not limited to two pairs as illustrated in FIGS. 2A-2D. In practice, the number of damper assemblies is set by the degree of freedom allowed and the geometry of the kinematic-mount.

Figure 3:
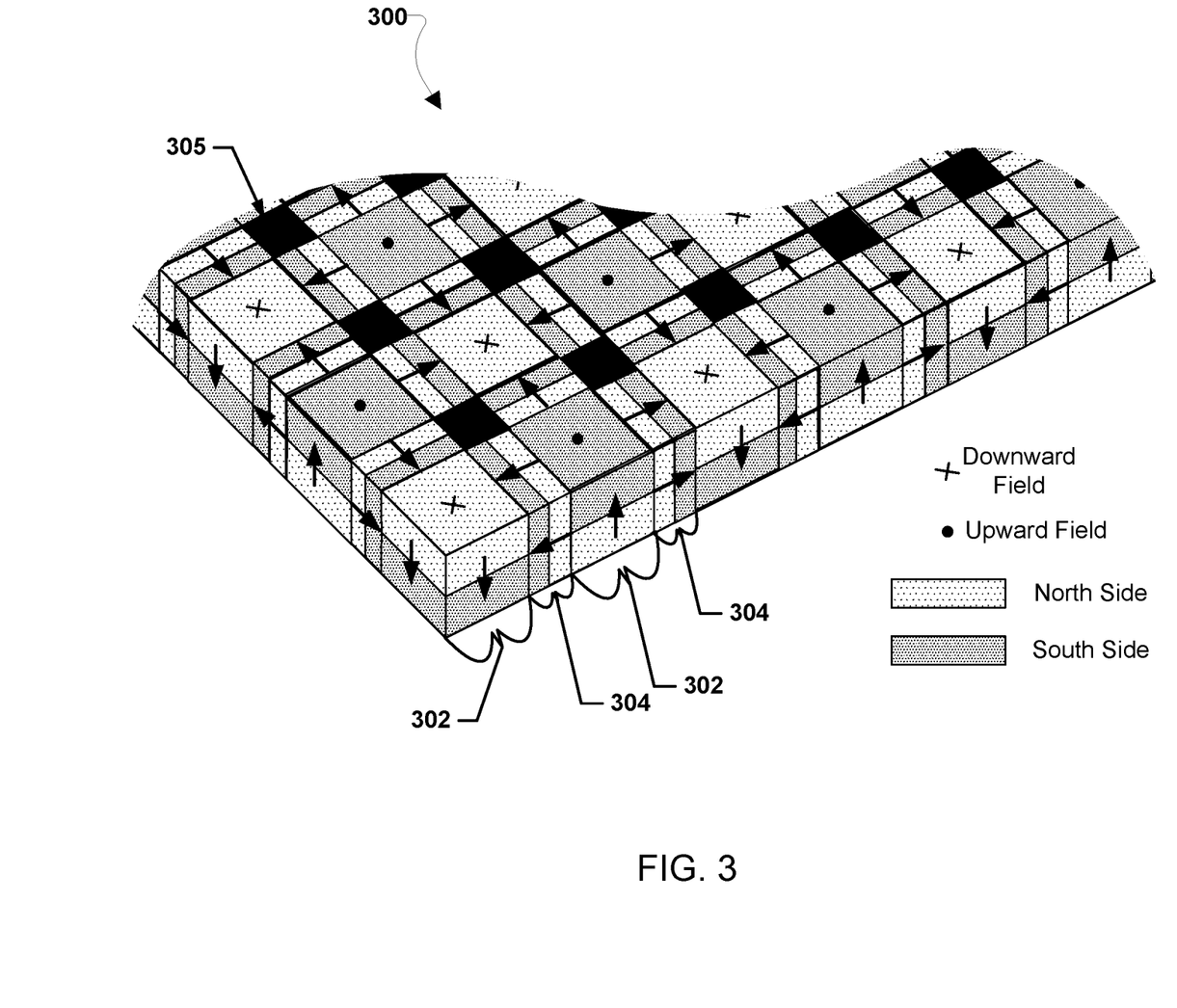
FIG. 3 illustrates an example two-dimensional magnetic array configuration suitable for use in various embodiments.

FIG. 3 illustrates a portion of an example two-dimensional magnetic array 300 suitable for use in various embodiments. In various embodiments, the two-dimensional magnetic array 300 may be used as the magnetic array 102 or magnetic arrays 208. For example, the two-dimensional magnetic array 300 may be a two-dimensional Halbach magnet tiling including larger magnets 302 side-by-side with smaller magnets 304 and spacer material 305 to form a two-dimensional array. Topologically the magnets 302 and 304 may be orientated to provide a low reluctance return path to achieve the observed field concentration. This may be highly desirable to maximize eddy-current damping in the normal-metal copper plate on the guard stage and minimize magnetic fields in the vicinity of the superconducting sensors (or similar mounted sensors) mounted on the cold stage.

Figure 4:
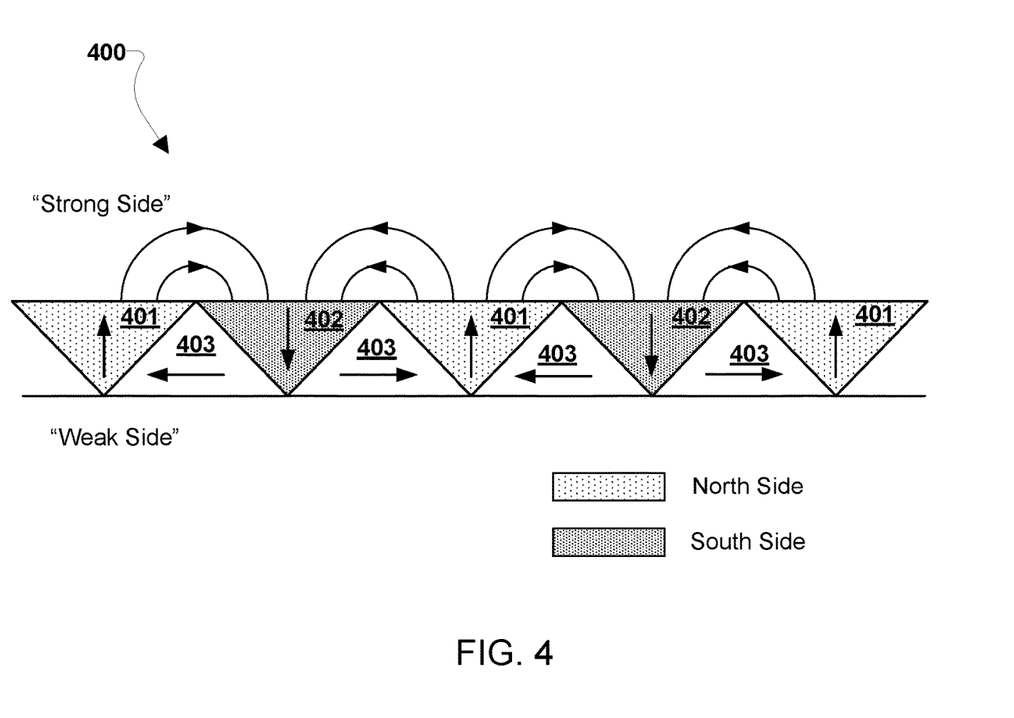
FIG. 4 illustrates an example one-dimensional magnetic array configuration suitable for use in various embodiments.

FIG. 4 illustrates a portion of an example one-dimensional magnetic array 400 suitable for use in various embodiments. In various embodiments, the one-dimensional magnetic array 400 may be used as the magnetic array 102 or magnetic arrays 208. The one-dimensional array 400 may include magnets 401, 402, and spacer material 403 arranged to provide a one-sided nature of the magnetic flux with a Halbach array configuration.

One of ordinary skill in the art will understand when operated in the Earth's (or similar) gravitational field, the various embodiments may often be operated in the orientations as discussed with reference to, and illustrated in, FIGS. 1-4. However, for reasonable loads (i.e., within the designs capabilities) such orientation is not a fundamental requirement of the various embodiments and different orientations may be used. For example, when operated in a spaceborne microgravity environment, the orientation of a cryogenic-kinematic-mount may not matter and the cryogenic-kinematic-mounts of various embodiments may be oriented differently than as discussed with reference to, and illustrated in, FIGS. 1-4.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein

What is claimed is:

1. A cryogenic-kinematic-mount, the cryogenic-kinematic-mount comprising:
a cold side stage;
a warmer side stage opposite the cold side stage; and
a dampening and tensioning system between the cold side stage and warmer side stage,
wherein the dampening and tensioning system includes at least one magnetic array, wherein the dampening and tensioning system provides dampening and thermal isolation between the cold side stage and the warmer side stage, and wherein the dampening and tensioning system further includes at least one high electrical conductivity metal plate separated from the at least one magnetic array by a gap therebetween, wherein the at least one high electrical conductivity metal plate comprises copper.

2. The cryogenic-kinematic-mount of claim 1, wherein the at least one magnetic array is a Halbach array.

3. The cryogenic-kinematic-mount of claim 2, wherein the Halbach array is a two-dimensional Halbach array.

4. The cryogenic-kinematic-mount of claim 2, wherein the Halbach array is a one-dimensional Halbach array.

5. The cryogenic-kinematic-mount of claim 1, wherein the at least one high electrical conductivity metal plate comprises at least 99.99% annealed copper.

6. The cryogenic-kinematic-mount of claim 1, wherein the dampening and tensioning system includes a plurality of synthetic fiber strands coupled to the cold side stage and warmer side stage.

7. The cryogenic-kinematic-mount of claim 6, wherein the plurality of synthetic fiber strands are poly-para-phenylene terephthalamide (PPTA) strands.

8. The cryogenic-kinematic-mount of claim 6, wherein the plurality of synthetic fiber strands comprises six synthetic fiber strands.

9. The cryogenic-kinematic-mount of claim 1, wherein the dampening and thermal isolation between the cold side stage and the warmer side stage is provided without use of electronics or software feedback-based controls.

10. The cryogenic-kinematic-mount of claim 1, wherein the cold side stage is coupled to an instrument package and the cryogenic-kinematic-mount provides structural support and precision alignment for the instrument package.

11. The cryogenic-kinematic-mount of claim 1, wherein a strength of a constraint of the cryogenic-kinematic-mount in at least one degree of freedom is different from a strength of the cryogenic-kinematic-mount in a different degree of freedom.

12. A cryogenic-kinematic-mount, comprising:
a cold side stage;
a warmer side stage opposite the cold side stage; and
a dampening and tensioning system between the cold side stage and warmer side stage,
wherein the dampening and tensioning system includes two magnetic arrays opposite two metal plates, wherein the dampening and tensioning system provides dampening and thermal isolation between the cold side stage and the warmer side stage, and wherein the dampening and tensioning system includes a plurality of synthetic fiber strands coupled to the cold side stage and warmer side stage.

13. The cryogenic-kinematic-mount of claim 12, wherein the two magnetic arrays are two-dimensional Halbach arrays.

14. The cryogenic-kinematic-mount of claim 13, wherein the two metal plates each comprise at least 99.99% annealed copper.

15. The cryogenic-kinematic-mount of claim 14, wherein the dampening and tensioning system includes six synthetic fiber strands coupled to the cold side stage and warmer side stage.

16. The cryogenic-kinematic-mount of claim 15, wherein the six synthetic fiber strands are six poly-para-phenylene terephthalamide (PPTA) strands.

17. The cryogenic-kinematic-mount of claim 16, wherein the dampening and thermal isolation between the cold side stage and the warmer side stage is provided without use of electronics or software feedback-based controls.

18. The cryogenic-kinematic-mount of claim 17, wherein a strength of a constraint of the cryogenic-kinematic-mount in at least one degree of freedom is different from a strength of the cryogenic-kinematic-mount in a different degree of freedom.

19. The cryogenic-kinematic-mount of claim 12, wherein the two metal plates are comprised of normal metal.

\* \* \* \* \*